United States Patent [19]
Jödicke et al.

[11] Patent Number: 5,134,342
[45] Date of Patent: Jul. 28, 1992

[54] QUASI-OPTICAL GYROTRON HAVING A HOLOGRAM OUTPUT COUPLING

[75] Inventors: Bernd Jödicke, Unterehrendingen; Hans-Günter Mathews, Oberehrendingen, Switzerland

[73] Assignee: Asea Brown Boveri Ltd., Baden, Switzerland

[21] Appl. No.: 553,606

[22] Filed: Jul. 18, 1990

[30] Foreign Application Priority Data

Jul. 28, 1989 [CH] Switzerland .......................... 2822/89

[51] Int. Cl.$^5$ .......................... H01J 23/40; H03B 9/01
[52] U.S. Cl. .......................... 315/5; 315/39; 331/79; 333/230
[58] Field of Search .......................... 315/4, 5, 39; 372/2; 331/79; 333/227, 230

[56] References Cited

U.S. PATENT DOCUMENTS

| | | | |
|---|---|---|---|
| 2,634,372 | 4/1953 | Salisbury | 315/4 X |
| 3,609,585 | 9/1971 | Hufnagel | 372/99 |

FOREIGN PATENT DOCUMENTS

| | | | |
|---|---|---|---|
| 27192 | 1/1989 | Japan | 315/4 |
| 664045 | 1/1988 | Switzerland . | |
| 668865 | 1/1989 | Switzerland . | |
| 797538 | 10/1981 | U.S.S.R. | 315/4 |
| 1345273 | 10/1987 | U.S.S.R. | 333/227 |

OTHER PUBLICATIONS

Brown Boveri Review, vol. 6, Jun. 1987, H. G. Mathews et al.: "The gyrotron-A key component of high-power microwave transmitters", pp. 303-307.
Applied Optics, vol. 26, No. 18, Sep. 15, 1987, Optical Society of America, R. K. Kostuk et al.: "Design considerations for holographic optical interconnects", pp. 3947-3953.

Primary Examiner—Eugene R. LaRoche
Assistant Examiner—Benny T. Lee
Attorney, Agent, or Firm—Oblon, Spivak, McClelland, Maier & Neustadt

[57] ABSTRACT

In a quasi-optical gyrotron which exhibits a quasi-optical resonator having two mirrors (4a, 4b) which opposite one another on a resonator axis (5), the required electromagnetic radiation is coupled out by means of a hologram. In this arrangement, at least one of the two mirrors (4b) of the resonator exhibits a reflective surface (8b) provided with a hologram. The hologram is constructed in such a manner that the radiation to be coupled out is scattered in the direction of at least exactly one coupling-out axis (10), the at least exactly one coupling-out axis (10) enclosing a predetermined angle α not equal to zero with the resonator axis (5). The angle α is preferably as small as possible.

10 Claims, 2 Drawing Sheets

QUASI-OPTICAL GYROTRON HAVING A HOLOGRAM OUTPUT COUPLING

BACKGROUND OF THE INVENTION

1. Field of the Invention

The invention relates to a quasi-optical gyrotron comprising first means for generating an electron beam extending in the direction of an electron beam axis, second means for generating a static magnetic field aligned in parallel with the electron beam axis, wherein due to the static magnetic field the electrons of the electron beam are forced into gyration, a quasi-optical resonator which exhibits two mirrors arranged opposite one another on a resonator axis aligned perpendicularly to the electron beam axis, in which resonator an alternating electromagnetic field is excited by the gyration of the electrons, and third means for coupling electromagnetic radiation out of the resonator.

2. Discussion of Background

A quasi-optical gyrotron of the type initially mentioned is known, for example, from Patent CH-664045 or from the article "Das Gyrotron, Schlüsselkomponente for Hochleistungs-Mikrowellensender" (the gyrotron, key component of high-power microwave transmitters), H. G. Matthews, Minh Quang Tran, Brown Boveri Review 6-1987, pages 303–307. Compared with a conventional cylindrical gyrotron, this gyrotron has the advantage that it can generate high power. The reason for this lies in, among other things, the following facts;

1. Since the resonator is not coaxial but perpendicular to the electron beam axis, it can be dimensioned independently of the "electron beam part". In particular, the radiation exposure of resonator mirror and RF window can be reduced by enlarging the diameter.
2. The energy present in the resonator can be coupled out via two outputs, namely at each of the two resonator mirrors.

A quasi-optical gyrotron of the type mentioned operates at frequencies of typically 150 GHz and more and can generate radiation powers of a few 100 kW in continuous mode. However, having regard to such gyrotrons being used for heating plasma in fusion reactors, continuous powers of 1 MW and more are required. Difficulties of the most varied type arise in the achievement of such high powers. One problem, in particular, is how to couple the millimeter waves efficiently out of the resonator.

From patent CH-668,865, for example, the following two proposals for coupling out of an open resonator of the type initially mentioned are known: coupling-out through annular slots in the resonator mirror and coupling-out at the edge of a mirror with a reduced diameter. However, neither of the two attempts at a solution is satisfactory. Because of the high electric field strengths occurring with high radiation powers, hazardous flash-overs can occur, on the one hand, at the edges of the slots. On the other hand, no Gaussian modes i.e., modes which yield a radiation pattern with no side lobes, are coupled out in this manner. The fact is, however, that it is only the Gaussian modes which can be transmitted without losses via a relatively long distance to a load.

It has been proposed in conjunction with the construction of high-power lasers to achieve the coupling of the radiation out of the optical resonator in such a manner that one of the two reflecting resonator mirrors is provided with a periodic structure so that about 20% of the resonator energy is coupled out laterally at a given angle. In particular, a coupling-out mirror is known from U.S. Pat. No. 3,609,585 which exhibits periodic narrow troughs which are separated by wide flat sections. The troughs in this arrangement, which are responsible for the coupling-out, are constructed to be sawtooth-shaped.

This solution known from the field of laser design, however, is not suitable for a quasi-optical gyrotron. Apart from the pointed edges, it is mainly also the wave-optical effects which are disadvantageous and which naturally already become important at relatively large dimensions (mm range) in the case of millimeter waves and lead to unwanted diffraction peaks or secondary diffraction peaks.

SUMMARY OF THE INVENTION

Accordingly, one object of this invention is to provide a novel gyrotron of the type initially mentioned, in which the required electromagnetic radiation is coupled with high efficiency out of the quasi-optical resonator. In particular, it is the object of the invention to develop a gyrotron of the type mentioned in such a manner that the required radiation is coupled out in the form of a Gaussian mode.

According to the invention, the solution consists in that the third means comprise at least one hologram which is at least one hologram on a reflective surface of one of the two mirrors of the resonator and has such characteristics that the radiation to be coupled out is scattered in the direction of at least one coupling-out axis, the at least one coupling-out axis enclosing a predetermined angle A not equal to zero with the resonator axis.

The core of the invention lies in the fact that the hologram does not, like a conventional ruled grating, always exhibit several directions of diffraction in which the incident wave, that is to say the Gaussian mode of the resonator, is scattered, but only one predeterminable number of well-defined directions of scattering. The radiation to be coupled out is thus always directed only in the required direction. In addition, the hologram can be used for generating the required Gaussian waves which can then be conducted to a load without significant losses.

In a quasi-optical gyrotron in which the static magnetic field is generated by two coils in a Helmholtz arrangement, resonator axis and coupling-out axis are preferably located in a common plane perpendicular to the electron beam axis. The angle between resonator and coupling-out axis is advantageously just large enough for the coupled-out radiation to be able to pass essentially undisturbed laterally next to the opposite mirror of the resonator.

It may be of advantage to provide several coupling-out axes. In this embodiment, the radiation load is attributed to several RF windows. The total power of the gyrotron can thus be multiplied when the load carrying capability of the RF windows is limited.

The multiplication described can be achieved in various ways. Either one reflective surface is provided with a hologram which, for example, serves exactly two coupling-out axes, or each of the two mirrors exhibits a hologram which, for example, serves exactly one coupling-out axis each.

In general, the hologram cannot be comprehensively described by means of concrete physical characteristics. Instead, it is determined by its specific characteristic of scattering a given incident wave at one or several defined angles.

The hologram is essentially a laterally and depth-modulated electrically conductive reflective surface having a structural size of the order of magnitude of one wavelength of the electromagnetic radiation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
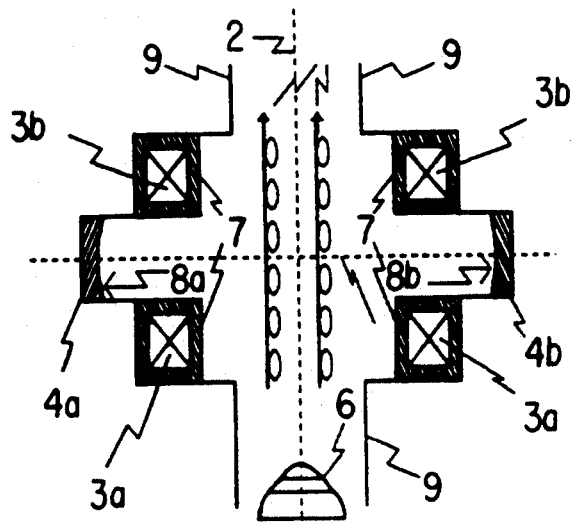
FIG. 1 shows a diagrammatic representation of a quasi-optical gyrotron in longitudinal section.

Referring now to the drawings, wherein like reference numerals designate identical or corresponding parts in the several views, FIG. 1 shows a preferred embodiment of the invention. A corresponding quasi-optical gyrotron comprises first means 6 for generating a, for example, annular electron beam 1 which extends along an electron beam axis 2. The said first means 6 comprise, for example, a well-known magnetron injection gun. Two coils 3a, 3b in Helmholtz arrangement (that is to say essentially having a mutual spacing corresponding to their radius) generate a static magnetic field parallel to the electron beam axis 2 so that the electrons of the electron beam 1 are forced into gyration.

A quasi-optical resonator formed by two mirrors 4a, 4b, having respective reflective surfaces 8a, 8b arranged opposite of one another on a resonator axis 5, is arranged between the two coils 3a, 3b in such a manner that its resonator axis 5 is aligned perpendicularly to the electron beam axis 2.

Due to the gyration of the electrons, a radio frequency alternating electromagnetic field is excited in the resonator so that the required electromagnetic radiation can be coupled out of the resonator with suitable means and delivered through a RF window and, if necessary, a waveguide, to a load. The RF window transparently closes an evacuated vessel 9, in which the parts described are accommodated, with respect to the external space (for example a waveguide).

The two coils 3a, 3b, which exert strong forces upon one another, are braced against one another with the aid of a support structure 7. This exhibits holes or free spaces suitable for the resonator. The support structure 7 can be, for example, a steel carrier provided with holes or a support frame of suitably arranged titanium rods.

The paths of the gyrotron hitherto described are sufficiently well known (for example from the prior art initially quoted). A detailed explanation of it can therefore be omitted in this case.

In contrast, the manner of coupling-out is novel. This will be discussed in the text following.

Figure 2A:
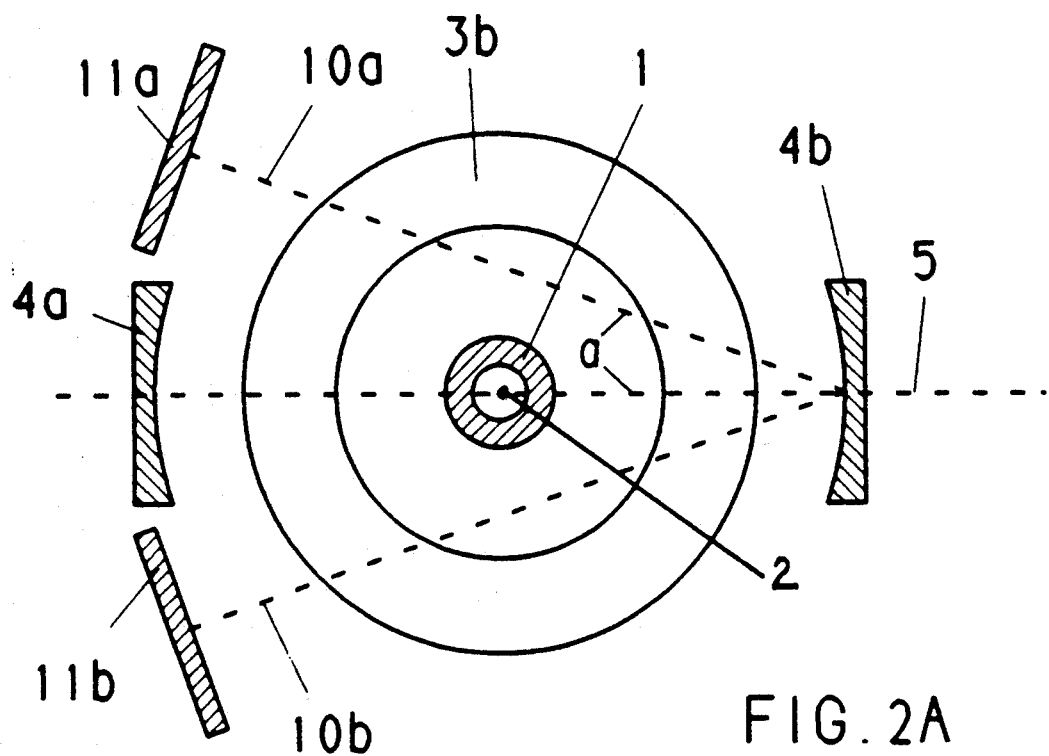
FIG. 2A and 2B are diagrammatic representation of the quasioptical gyrotron in cross section.

FIG. 2A shows the resonator according to the invention in cross section. In this representation, the electron axis 2 is perpendicular to the plane of the drawing. Behind or in the support structure 7, respectively, the coil 3b can be seen. For the rest, the parts already described with reference to FIG. 1 are provided with like reference numerals.

The mirrors 4a, 4b both have a cross section filling the resonator and are, for example, circular. They each have a metallic or superconductive and preferably spherically curved reflector surface 8a, 8b. In accordance with a particularly preferred embodiment, one of the two reflective surfaces 8b exhibits a hologram which couples out a part of the alternating field oscillating in the resonator at a predetermined angle $\alpha$.

In one embodiment, the hologram on the mirror 4b couples the required radiation out of the resonator exclusively at the predetermined angle $\alpha$ along a coupling-out axis 10a. In this arrangement, $\alpha$ designates the angle which is enclosed by the resonator and coupling-out axis 5 and 10a, respectively. Angle $\alpha$ differs from zero by a definite amount in such a manner that the radiation coupled out can pass laterally next to the opposite mirror 4a. A RF window 11a is located on the coupling out axis 10a and closes the vessel 9 vacuum-tight with respect to a waveguide (not shown in the Figure) connected coaxially to the coupling-out axis 10a.

The angle $\alpha$ is preferably as small as possible. In this case, the radiation coupled out can just pass by relatively undisturbed unilaterally next to the mirror 4a. The angle $\alpha$ is then of the order of magnitude of the aperture angle, at which the mirror 4a is seen from the diffracting mirror 4b (that is to say depending on the ratio between mirror diameter and mirror spacing). It is typically of the order of magnitude of 20°–30°.

An advantage of such a minimum angle is that the support structure 7 only needs to exhibit a relatively short, that is to say approximately radially extending hole for the coupling-out and is thus not weakened any more than absolutely necessary.

Figure 3:
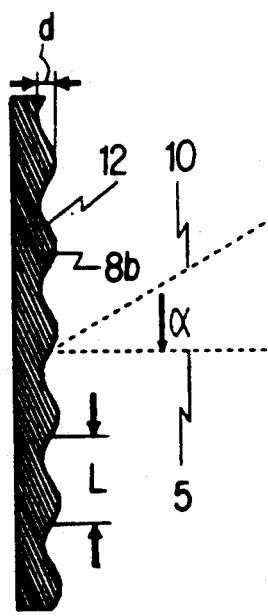
FIG. 3 shows a simplified cross section of a reflective surface with a hologram.

FIG. 3 shows by way of a suggestion a section of a reflective surface 8b provided with a hologram 12. The reflective surface 8b is essentially perpendicular to the resonator axis 5. The hologram 12 is embodied by a structure of the reflective surface 8b. In the actual case, the nature of the structure depends on the incident and the reflected waves, particularly on their wavelength, on the shape of their wave fronts, on the intensity distribution (ratio between the energy coupled out of the resonator and the energy stored in it) and its directions of propagation (for example angle $\alpha$). The structure can generally not be described by means of simple geometric parameters such as, for example, thickness d or period L.

In summary, the hologram 12 can be described, for example, as follows:

b 1. The incident wave is a Gaussian mode of the resonator and essentially impinges perpendicularly to the reflective surface (hologram plane).
2. The main proportion (for example 99%) of the incident wave is reflected as Gaussian mode in the opposite direction (that is to say in the direction of the resonator axis 5).
3. A small proportion (for example 1%) of the incident wave is scattered as Gaussian wave at an angle α (that is to say in the direction of the coupling-out axis 10).

If the Gaussian waves are determined, this also determines the hologram 12.

The parameters of the hologram also have an influence on the characteristics of the resonator. This is because the proportion of power coupled out can be used for setting the quality factor of the resonator. The gyrotron is optimized for the intended power range in this manner.

In the case of Gaussian waves, it can be said with respect to the geometric dimensions of the structure that the thickness d (depth of the structure) and the period L are typically of the order of magnitude of one wavelength of the required radiation and that no sharp edges occur. In the case of wavelengths in the mm range, geometric dimensions of the order of magnitude of some tenths up to a few millimeters can thus occur.

Figure 4:
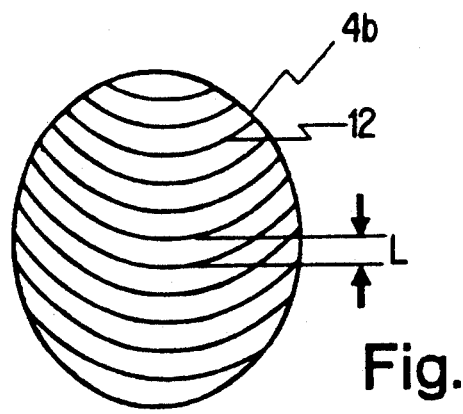
FIG. 4 shows a diagrammatic front view of a mirror with a hologram.

FIG. 4, finally, shows a diagrammatic front view of a round mirror. The hologram 12 for coupling-out the required Gaussian waves is indicated by several adjacently extending similar curved lines which illustrate structural raised portions. The raised portions are typically periodic in small regions but not over the entire hologram.

A computer is advantageously used for producing a hologram according to the invention. This computer is used for calculating the actual structure of the reflective surface when the parameters of the hologram explained above are input. Machine tools are then used for transferring the calculated structure onto the reflective surface. This production method utilizes the fact that the dimensions of the holographic structure are of the order of magnitude of about 1/10 mm.

Figure 2B:
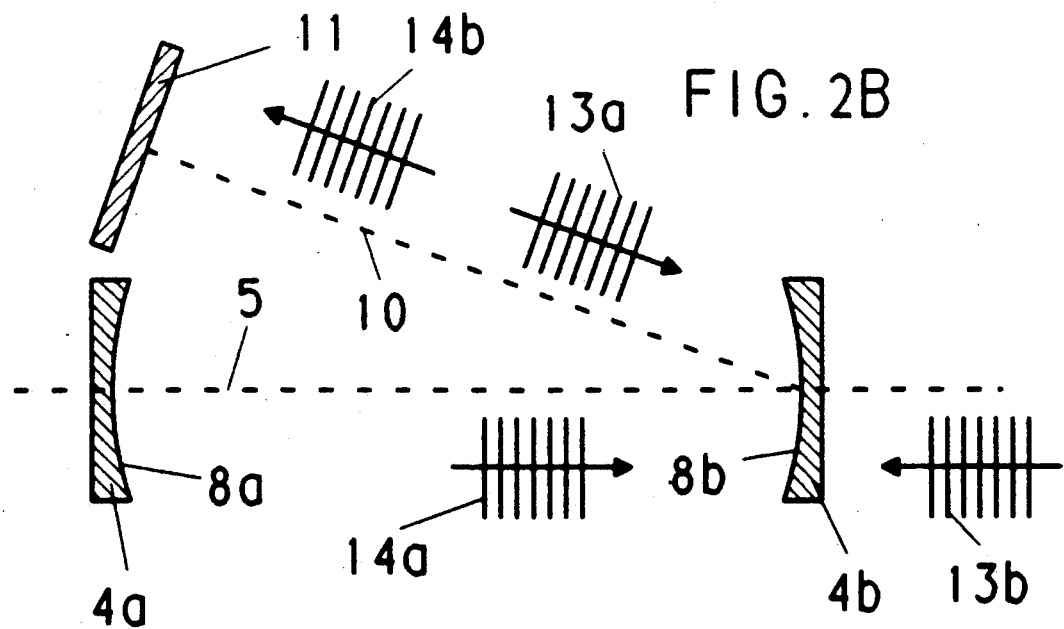

However, it is also possible to record the hologram by means of mm wave photography, as shown schematically in FIG. 2B. In this method, the Gaussian mode of the resonator is caused to interfere with the Gaussian wave to be coupled out, analogously to optical holography, and the resultant interference pattern is photographically recorded. How this is accomplished is shown schematically in FIG. 2B. From this drawing, it is seen that the holographic surface of the mirror 4b is defined by means of two Gaussian waves 13a and 13b which interfere with the reflective surface 8b of the mirror 4b. The first Gaussian wave 13a impinges on the reflective surface 8b along the direction of the coupling out axis 10. The second Gaussian wave 13b impinges on that surface from the back side and along he resonator axis 5, i.e., along a direction which is essentially perpendicular to the reflective surface 8b. The reflective surfaces 8b itself is identical with the hologram plane. The resulting interference pattern at the hologram plane can be fixed photographically to provide a hologram.

During normal working conditions of the gyrotron, the situation described with respect to FIG. 2B is reversed, i.e., the Gaussian wave 14a generated int eh resonator impinges on the reflective surface 8b or hologram plane from the front side. Part of the Gaussian wave 14a is then transformed into a second Gaussian wave 14b by means of the interference pattern or hologram formed on the reflective surface 8b, and leaves the mirror 4b in a direction toward the window 11.

In the text which follows, some further embodiments of the invention will be briefly discussed.

Up to now, it has always been a hologram on a spherically curved mirror which was being discussed. However, the invention is not restricted to such mirrors. It is quite easily also possible to use a plane mirror and integrate the effect of a spherical curvature in the hologram.

Another important point is the number of directions of scattering. It has hitherto always been emphasized that the coupling-out only occurs in exactly one direction. However, this only corresponds to one preferred embodiment. It is namely also quite within the context of the invention if the hologram scatters Gaussian waves in exactly two or generally in exactly n predetermined coupling-out directions. This is shown in FIG. 2A by means of a second coupling out axis 10b with a respective RF window 11b. The coupling out axes 10a, 10b are arranged symmetrically within a common plane with regard to the resonator axis 5. A multiple coupling-out can be an advantage, for example, when the matter concerned is that of multiplying the output power, which is restricted by the permissible load carrying capability of the RF windows, to obtain a high total power of the gyrotron. As before, it is of importance for a high efficiency that radiation is only scattered in the direction of the, for example, two predetermined coupling-out axes.

In the case of a hologram having two coupling-out directions, the two coupling-out axes are preferably placed symmetrically with respect to the resonator axis.

The total power can also be multiplied in a different manner, namely by providing both mirrors 4a, 4b of the resonator with one suitable hologram each. Thus, two Gaussian waves can be extracted, for example, by means of two holograms with exactly one coupling-out direction each.

In principle, the invention is not restricted to Gaussian wave shapes. Other and even arbitrary wave shapes can also be completely analogously coupled out for other applications.

In summary, it can be said that millimetre and submillimeter waves with a high continuous power can be generated by means of the type of coupling-out according to the invention. The waves thus generated can be moved without significant losses by means of conventional waveguides to remote loads.

Obviously, numerous modifications and variations of the present invention are possible in light of the above teachings. It is therefore to be understood that within the scope of the appended claims, the invention may be practised otherwise than as specifically described herein.

What is claimed as new and desired to be secured by Letters Patent of the United States is:

1. A quasi-optical gyrotron comprising
   a) an evacuated gyrotron chamber with a gyrotron main axis;
   b) first means for emitting a beam of electrons along an electron beam axis parallel to said gyrotron main axis;
   c) second means aligned along said electron beam axis for generating a static magnetic field aligned parallel to said electron beam axis forcing electrons of aid electron beam into gyration;
   d) a quasi-optical resonator, aligned along said gyration main axis, comprising two mirrors which are arranged opposite to one another on a resonator axis aligned perpendicular to said electron beam axis, wherein the gyration of said electrons excites an alternating electromagnetic field between said two mirrors;

e) third means, coupled to said quasi-optical resonator, for coupling out electromagnetic radiation of said alternating electromagnetic field from said quasi-optical resonator, comprising at least one hologram provided on a reflective surface of one of said two mirrors of said quasi-optical resonator for scattering radiation to be coupled out; and f) said scattered radiation being coupled out along at least one coupling out axis having a direction which is at an angle $\alpha$ with said resonator axis, where $\alpha$ is not equal to zero.

2. The quasi-optical gyrotron as claimed in claim 1, wherein said coupling out axis and said resonator axis are located in a common plane which is essentially perpendicular to said electron beam axis.

3. The quasi-optical gyrotron as claimed in claim 1, wherein:

a) the hologram comprises a three-dimensional structure which corresponds to the superposition of two Gaussian waves at a predetermined angle $\alpha$ in a hologram plane, wherein b) said two Gaussian waves correspond to an incident wave of the radiation of said electromagnetic alternating field and the scattered wave of said radiation, the incident wave impinging essentially parallel to said resonator axis.

4. The quasi-optical gyrotron as claimed in claim 1, wherein said hologram has a structure for scattering electromagnetic radiation only in the direction of said at least one coupling out axis.

5. The quasi-optical gyrotron as claimed in claim 1, wherein said hologram has a structure for scattering electromagnetic radiation only in the directions of exactly two coupling out axis.

6. The quasi-optical gyrotron as claimed in claim 1, wherein said angle $\alpha$ between the coupling out axis and the resonator axis is so small to allow said radiation coupled out just to pass by in an unaffected way next to the opposite second mirror of the resonator.

7. The quasi-optical gyrotron as claimed in claim 1, wherein said hologram is constructed in such a manner that a few percent of said alternating field excited in said resonator are coupled out.

8. The quasi-optical gyrotron as claimed in claim 1 wherein said hologram is a electrically conductive reflective surface with a three dimensional structure which is laterally-modulated and depth-modulated and has a structural size on the order of magnitude of one wavelength of said electromagnetic radiation.

9. The quasi-optical gyrotron as claimed in claim 1, wherein:

a) the second means for generating a static magnetic field comprises two coils arranged along the electron beam axis in a Helmholtz arrangement, b) the quasi-optical resonator is accommodated between the two coils, and c) the resonator axis and the coupling out axis are located in a common plane perpendicular to the electron beam axis.

10. A quasi-optical gyrotron as claimed in claim 1, wherein a) the reflective surface lies in a plane substantially perpendicular to the resonator axis, and b) said reflective surface is substantially circular in a cross-section of said plane, and c) the mirrors are substantially spherically curved.

* * * * *